United States Patent [19]

Nishi et al.

[11] Patent Number: 4,768,855
[45] Date of Patent: Sep. 6, 1988

[54] OPTICAL FIBER HOLDER
[75] Inventors: Osamu Nishi; Takeo Seike, both of Yokohama, Japan
[73] Assignee: Sumitomo Electric Industries, Ltd., Osaka, Japan
[21] Appl. No.: 84,151
[22] Filed: Aug. 12, 1987
[30] Foreign Application Priority Data
Aug. 12, 1986 [JP] Japan .................. 61-190984
[51] Int. Cl.⁴ .......................... G02B 6/36; G02B 7/26
[52] U.S. Cl. ............................. 350/96.20; 350/96.21
[58] Field of Search ................ 350/96.20, 96.21, 96.22
[56] References Cited
U.S. PATENT DOCUMENTS
4,345,137 8/1982 Mignien et al. ................. 350/96.20
4,537,466 8/1985 Moisson et al. ................. 350/96.20

Primary Examiner—William L. Sikes
Assistant Examiner—Robert E. Wise
Attorney, Agent, or Firm—Cushman, Darby & Cushman

[57] ABSTRACT

An optical fiber holder for use in optical fiber splicing, which comprises a pair of upper and lower holding bodies pivotally connected each other, at least one supporting member slidably mounted on at least one of the holding bodies, at least two pairs of upper and lower rollers facing each other, one of the upper and lower rollers being rotatably mounted on the supporting member so that they are arranged on a line passing through the axes of the rollers which is inclined with respect to the horizontal line, the other being mounted on one of the holding bodies, the supporting member being forced by a spring means so that the rollers mounted thereon come close to the opposite rollers.

2 Claims, 2 Drawing Sheets

OPTICAL FIBER HOLDER

FIELD OF THE INVENTION

This invention relates to an optical fiber holder and, more particularly, a holder for holding an optical fiber so as to allow the optical fiber to be movable in its axial direction.

BACKGROUND OF THE INVENTION

As an optical fiber splicing process, there has been known V-shaped groove splicing in which two lengths of optical fibers are connected in series by positioning optical fibers in a V-shaped groove of a substrate to butt them at their ends and then bonding them by fusion. In such a process, it is a serious problem how to prevent an excess stress acting on the optical fibers to be spliced. Since the optical fibers are easily damaged by an excess tensile force, bending or torsion, it is required to introduce the optical fibers into the groove of the substrate so that they have a curvature as large as possible.

For this end, there have been so far proposed to use various types of optical fiber holders, which are arranged opposite sides of the substrate to hold each optical fiber at the most bent portion of the optical fiber to be spliced so that each optical fiber is movable in the axial direction. One of the known optical fiber holder, comprises, as shown in FIG. 4, plural pairs of fixed pins 20 and movable pins 22 so arranged that they are facing each other in parallel, said movable pins 22 being fixed to a movable plate 19 forced upwardly by a spring 21. In this holder, an optical fiber 30 to be spliced is put between the fixed pins 20 and movable pins 22 to hold t by the frictional force between the optical fiber 30 and pins 20, 22. However, it is impossible with this holder to hold the optical fiber under a constant holding force since the frictional resistance between the optical fiber and the pins varies with surface conditions of the optical fiber and conditions of the open air. If the frictional forces between the fiber and pins are increased by oil or dust stain on the optical fiber, it occasionally obstructs smooth movement of the optical fiber in its axial direction, resulting in breakage of the optical fiber by a large tensile or bending force acting thereon.

Another optical fiber holder comprises, as shown in FIGS. 5 and 6, a holding guide 23 put between a main body 24 and a push plate 26 forced upwardly by a spring 25. In use, an optical fiber 30 is inserted into the guide member 23 held between the main body 24 and push plate 26 by the frictional force between them. If the holder is used under inclined conditions, the guide member 23 receives a force causing its sliding movement under the influence of gravity. For this reason, the axial force varies with the inclination angle of the holder, thus making it difficult to hold the optical fibers under the predetermined constant holding force so that they are movable in the axial direction.

SUMMARY OF THE INVENTION

It is therefore an object of the present invention to provide an optical fiber holder used for connecting in series two lengths of optical fiber, which overcomes the aforesaid disadvantages.

Another object of the present invention is to provide an optical fiber holder which makes it possible to hold an optical fiber under a constant holding force so that the optical fiber is free to move in the axial direction without receiving any excess stress.

According to the present invention these and other objects are solved by providing an optical fiber holder comprising a pair of upper and lower holding bodies pivotally connected each other, at least one supporting member slidably mounted on at least one of the holding bodies, at least two pairs of upper and lower rollers facing each other, one of said upper and lower rollers being rotatably mounted on the supporting member so that they are arranged on a line passing through the axes of the rollers which is inclined with respect to the horizontal line, the other being mounted on one of said holding bodies, said supporting member being forced by a spring means so that the rollers mounted thereon come close to the opposite rollers.

Preferably, the rollers are provided with a frictional layer, i.e., a layer having a high frictional resistance to prevent slip between the rollers and optical fiber. Such a frictional layer makes it possible to rotate the rollers in response to the forces applied in the axial direction of the optical fiber.

In use, two optical fiber holders are arranged on opposite sides of a V-grooved substrate and two lengths of optical fibers to be spliced are put between pairs of upper and lower rollers of the respective holders so that the ends of the fibers face downwardly. After positioning ends of the optical fibers in the V-shaped groove of the substrate, a force is applied to the optical fiber in the axial directions of the respective optical fibers, so that the rollers rotate in response to the axial movement of the optical fiber. At the same time, a downward force is applied to the optical fiber under the influence of gravity, so that the end of each fiber is forced to the bottom of the V-shaped groove, thus making it possible to prevent it from floating in the air.

The present invention will be further apparent from the following description in conjunction with the accompanying drawings which show, by way of example only, a preferred embodiment thereof.

DESCRIPTION OF THE PREFERRED EMBODIMENT

Figure 1:
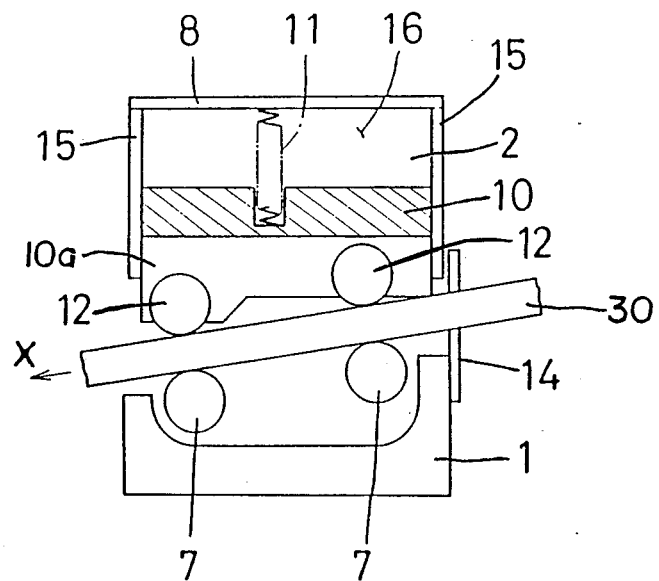
FIG. 1 is a partially cutaway front view of an optical fiber holder embodying the present invention.
Figure 2:
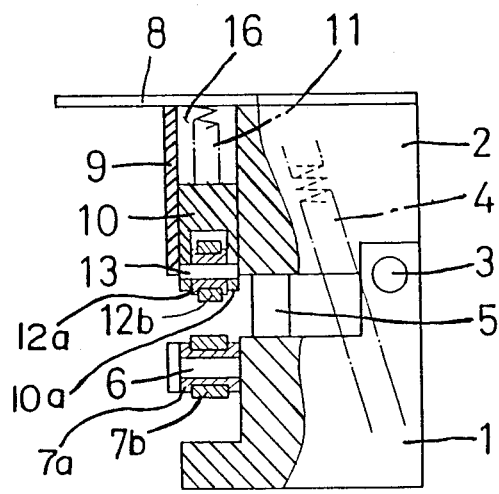
FIG. 2 is a partially cutaway side view of the holder of FIG. 1.
Figure 3:
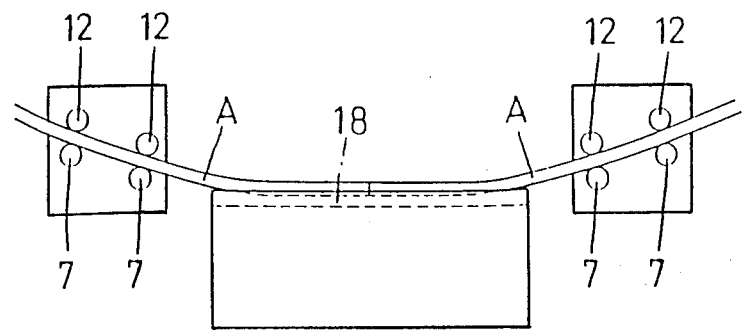
FIG. 3 is a front view showing an arrangement of optical fiber holders of FIG. 1.
Figure 4:
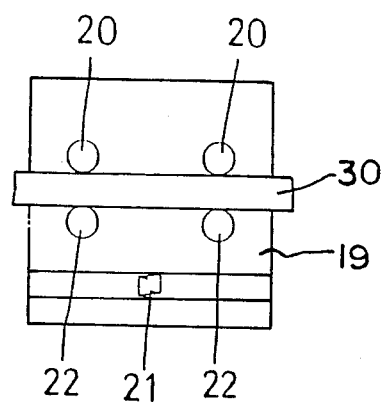
FIG. 4 is a front view of an optical fiber holder of the prior art.
Figure 5:
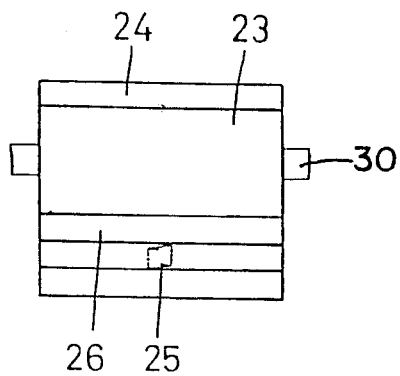
FIG. 5 is a front view showing another form of an optical fiber holder of the prior art.
Figure 6:
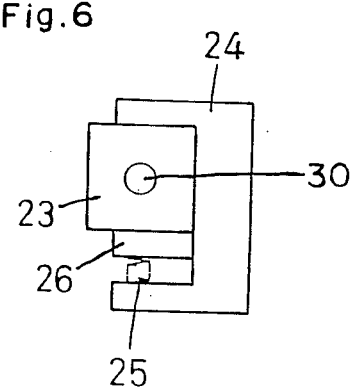
FIG. 6 is a side view of the holder of FIG. 5.

Referring now to FIGS. 1 and 2, there is shown an optical fiber holder embodying the present invention, which comprises a lower fixed holding body 1 and an upper movable holding body 2 pivotally mounted on the fixed holding body 1 by a shaft 3. The upper holding body 2 is pulled toward the fixed holding body 1 by a tension spring 4 which is hooked at its opposite ends to the holding bodies 1 and 2. The fixed holding body 1 is provided at its upper part with a stopper 5 to prevent excessive movement of the movable holding body 2.

The movable holding body 2 is provided at its top with a horizontal plate 8 extending forwardly, and at its opposite sides with side plates 15 to form a housing 16 for a supporting member 10 in cooperation with a front plate 9 extending downwardly from the top plate 8. The supporting member 10 is slidably mounted in the housing 16 and forced downwardly by a compression spring 11 which is arranged between the top plate 8 and supporting member 10 so that the upper rollers 12 come close to the lower fixed rollers 7. The supporting member 10 has a pair of flanges 10a extending downwardly from its front and rear parts.

The optical fiber holder is provided with plural pairs of upper rollers 12 and lower rollers 7. The lower rollers 7 are rotatably mounted on the front part of the fixed holding body 1 by roller shafts 6 so that the roller 7 on the side of the guide plate (in FIG. 1, right roller 7) is positioned at a level higher than the other so that they are arranged on a line passing through the axes of the rollers, which is inclined with respect to the horizontal line. The upper rollers 12 are rotatably mounted on the supporting member 10 by roller shafts 13 so that the upper and lower rollers 12 and 7 are put in pairs, face to face. The rollers 7 and 12 are respectively composed of a cylindrical body 12a, and a rubber layer 12b integrally formed thereon to form a layer having a high frictional resistance. Such a frictional layer may be formed by roughening the surface of the rollers. The upper or lower rollers may be fixed rollers or fixed guiding members, provided that the others are rotatable rollers.

The fixed holding body 1 is provided at its one side with a guide member 14 through which an optical fiber 30 is introduced between the upper and lower rollers 12 and 7.

In use, the thus constructed optical fiber holder is operated in the following manner: Firstly, the upper holding body 2 is pivoted upwardly by lifting the front part of the top plate 8 to increase the distance between the lower and upper rollers 7, 12 and, after inserting an optical fiber 30 between the rollers through the guide plate 14, the upper holding body 2 is returned to the horizontal position to put the optical fiber 30 between the upper and lower rollers 7, 12. The upper rollers 12 are forced toward the lower rollers 7 by the spring 11, so that the optical fiber 30 is held by the frictional force between the contacting surfaces of the optical fiber 30 and rollers 7, 12. In this case, the force of spring is so determined that the holding forces acting on the optical fiber 30 is sufficiently greater than the sliding frictional force between the optical fiber 30 and rollers 7, 12.

If the optical fiber 30 is pulled in the direction indicated by an arrow X in FIG. 1, the rollers 7, 12 rotate clockwise or counterclockwise to move the optical fiber 30 in its axial direction. The optical fiber 30 does not slide on the rollers 7, 12, but is moved by the rotational motion of the rollers, so that the optical fiber 30 is pulled in the axial direction smoothly.

Even if the frictional resistance between the optical fibers and rollers varies with surface conditions of the optical fiber or conditions of air, it is possible to move the optical fibers 30 in the axial direction by adjusting the force of the compression spring 11 so that the frictional force between the optical fiber and the roller surface is greater than that between the rollers 7, 12 and roller shaft 6, 13 to prevent slip between the optical fiber and roller. Since the optical fiber is moved in the axial direction by rotational motion of the rollers 7, 12, the holding force of the holder scarcely varies even if the holder is put under inclined conditions, thus making it possible to use it in the same manner as that under the horizontal conditions.

Since the optical fiber is diagonally held by the holder so that its end faces downwardly, a downward force is applied to the optical fiber under the influence of gravity, thus making it possible to prevent the end of each fiber from floating in the air, which in turn makes it possible to align the optical fibers in the V-shaped groove of the substrate.

In the foregoing embodiment, the supporting member 10 is slidably mounted on the upper holding body 2, but it may be slidably mounted on the lower holding body 1. Also, it is possible to slidably mount supporting members on both of the upper and lower holding bodies respectively.

What is claimed is:

1. An optical fiber holder comprising a pair of upper and lower holding bodies pivotally connected each other, at least one supporting member slidably mounted on at least one of the holding bodies, at least two pairs of upper and lower rollers facing each other, one of said upper and lower rollers being rotatably mounted on the supporting member so that they are arranged on a line passing through the axes of the rollers which is inclined with respect to the horizontal line, the other being mounted on one of said holding bodies, said supporting member being forced by a spring means so that the rollers mounted thereon come close to the opposite rollers.

2. The optical fiber holder according to claim 1 wherein the rollers are provided with a layer having a high frictional resistance to prevent slip between the rollers and optical fiber.

* * * * *